Sept. 4, 1923.
A. C. McCLOSKEY
1,466,883
COMBINED BUMPER AND FENDER FOR MOTOR VEHICLES
Filed Aug. 15, 1922    3 Sheets-Sheet 2
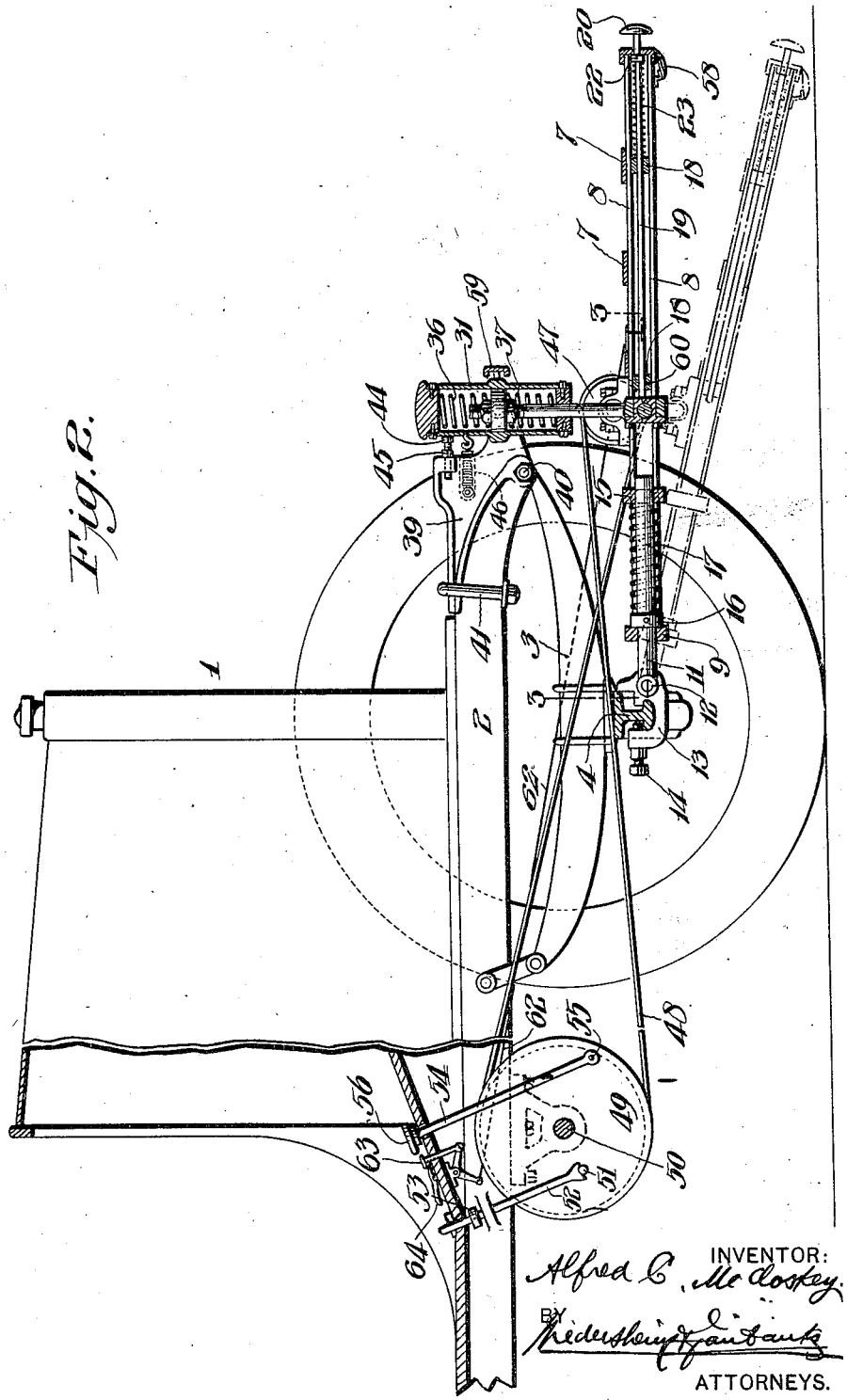

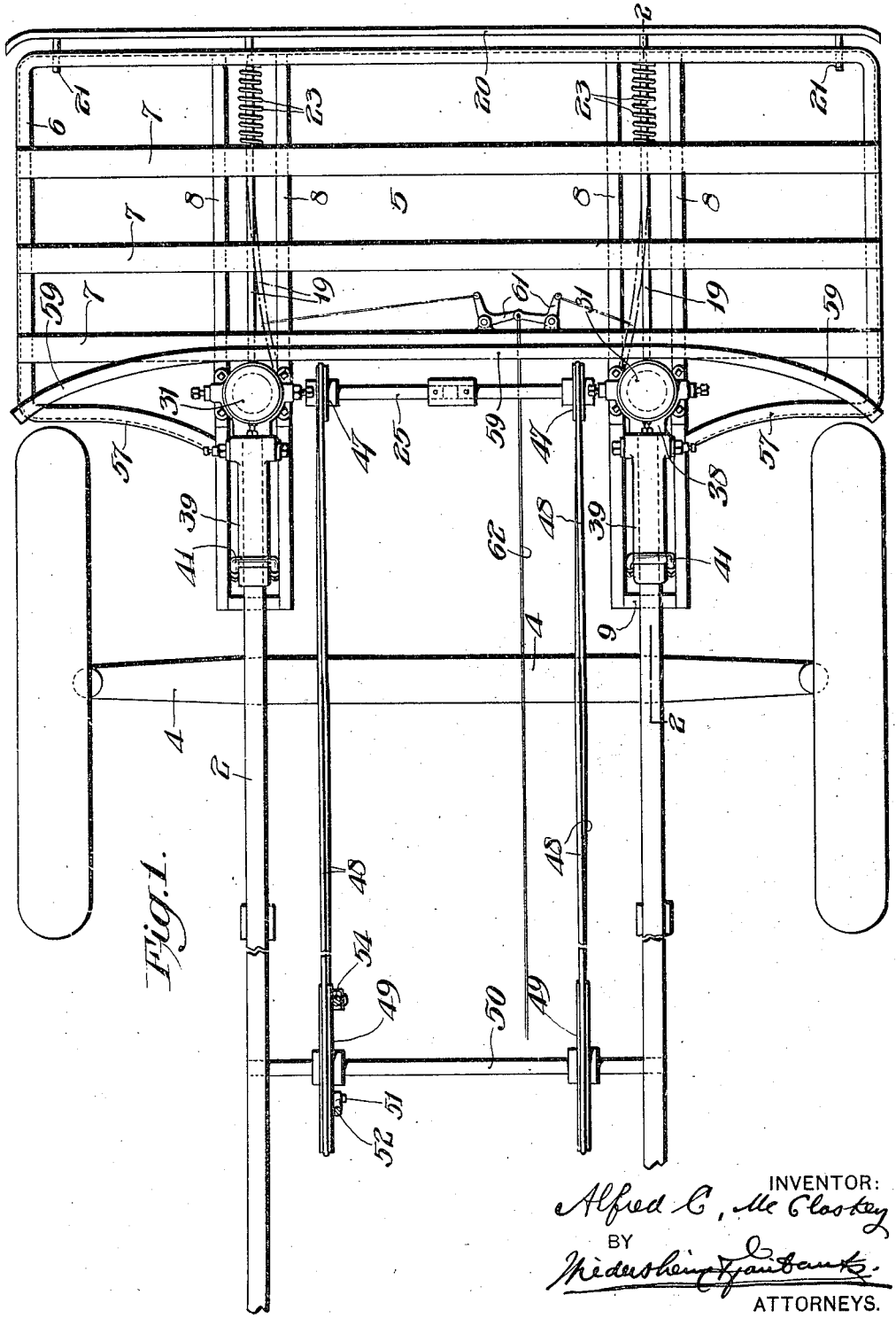

Sept. 4, 1923.   1,466,883
A. C. McCLOSKEY
COMBINED BUMPER AND FENDER FOR MOTOR VEHICLES
Filed Aug. 15, 1922   3 Sheets-Sheet 3
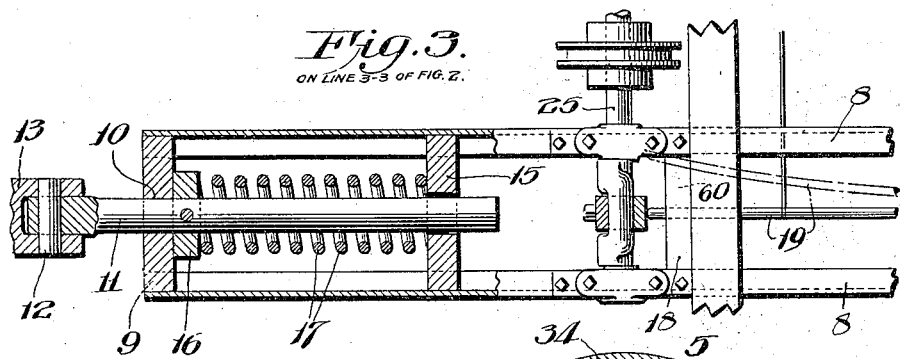
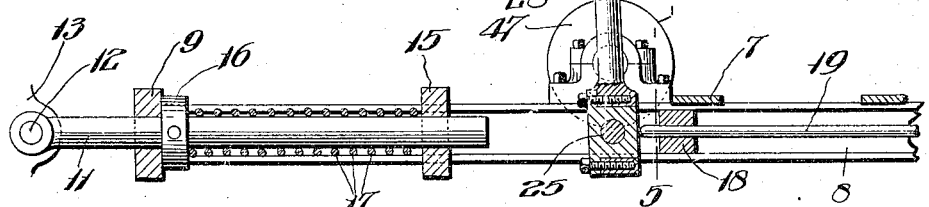
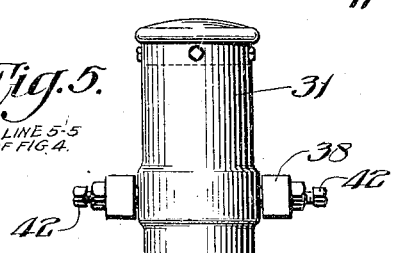
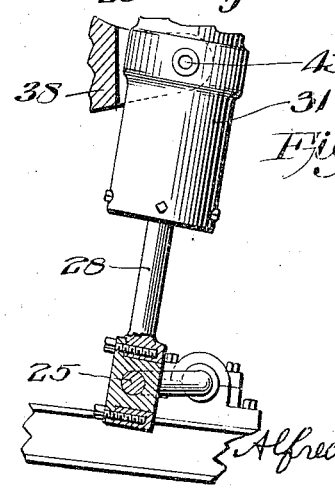
INVENTOR:
Alfred C. McCloskey
BY
ATTORNEYS Patented Sept. 4, 1923.

1,466,883

UNITED STATES PATENT OFFICE.

ALFRED C. McCLOSKEY, OF PHILADELPHIA, PENNSYLVANIA, ASSIGNOR TO FREDERIC W. BACON, OF PHILADELPHIA, PENNSYLVANIA.

COMBINED BUMPER AND FENDER FOR MOTOR VEHICLES.

Application filed August 15, 1922. Serial No. 581,950.

*To all whom it may concern:*

Be it known that I, ALFRED C. McCLOSKEY, a citizen of the United States, residing in the city of Philadelphia, in the county of Philadelphia, State of Pennsylvania, have invented a new and useful Combined Bumper and Fender for Motor Vehicles, of which the following is a specification.

My present invention comprehends a novel construction and arrangement of a combined bumper and fender for a motor vehicle which can be mechanically controlled by the operator to effect its release or to reset it, and which becomes automatically released if the fender is brought into contact with a foreign object.

It further comprehends a novel construction and arrangement of a combined fender and bumper which is preferably resiliency supported when in either its set or released position in order to overcome any tendency to rattle and to resiliently absorb and compensate for any shocks or stresses to which it is subjected.

It further comprehends a novel device of the character stated, wherein a minimum angle is formed when the fender is in its released position.

It further comprehends a novel construction and arrangement of fender which when in position or released produces under abnormal shock to the bumper, a braking action on the front wheels, irrespective of the angle to which they have been turned.

It further comprehends a novel construction of a combined fender and bumper wherein the fender is preferably carried by the front axle and resiliently supported by a crank connection, the release of the fender being effected by the action of the bumper against the bearings of the crank, which latter are resiliently supported, so that when they are moved off center from their locked position, the fender will be moved into its released position due to gravity and its own weight, and locked in such position.

It further comprehends novel means for cushioning the fender when the bumper becomes operative to release the fender.

It further comprehends novel means for rendering the bumper inoperative to effect the release of the fender.

Other novel features of construction and advantage will hereinafter more clearly appear in the detailed description and the appended claims.

For the purpose of illustrating my invention, I have shown in the accompanying drawings an embodiment thereof which is at present preferred by me, since such embodiment will give in practice satisfactory and reliable results. It is, however, to be understood that the various instrumentalities of which my invention consists can be variously arranged and organized, and that my invention is not limited to the precise arrangement and organization of these instrumentalities as herein shown and described.

Figure 1 represents a top plan view of a combined bumper and fender embodying my invention, in conjunction with a motor vehicle.

Figure 2 represents a section on line 2—2 of Figure 1.

Figure 3 represents a section on line 3—3 of Figure 2.

Figure 4 represents a section substantially on line 2—2 of Figure 1, showing more clearly on an enlarged scale, certain features of construction.

Figure 5 represents a section on line 5—5 of Figure 4.

Figure 6 represents in sectional elevation a portion of my device in a position which it assumes during the releasing operation and its movement to its downward position.

Similar numerals of reference indicate corresponding parts.

Referring to the drawings, 1 designates a motor vehicle of any desired or conventional type, which is provided in the usual manner with a chassis 2, to which are connected the front springs 3 which carry the front axle 4.

5 designates my novel construction and arrangement of fender, which is formed by a substantially rectangularly shaped fender portion 6, to which are connected the cross bars 7, said cross bars also being connected to longitudinally extending bars 8, which latter are arranged in pairs, and at the rear end of each pair is a closure 9, each of which is apertured as at 10 to receive a rod 11 which is pivotally connected at 12 to a bracket 13 which is secured to the front axle 4 by fastening devices 14. Each rod 11 passes through an apertured guide 15, see Figure 3.

16 designates a washer fixed to its respective rod 11, and between this washer and a guide 15 is interposed a spring 17. the bars 8 are preferably in the form of structural metal bars, such as for example, channel bars which are connected by the cross members 18, which are apertured to form guides for the tripping or releasing members 19, which at their forward ends are operatively connected with the bumper 20 in any desired manner. The bumper 20 is also provided with guide pins 21 which are guided in the fender.

Each tripping or releasing member 19 is preferably in the form of a rod or bar, to which is connected a set collar 22, between which and one of the guide members 18, is interposed a spring 23, the tendency of which is to maintain the bumper in its forward or normal position.

The bars 8 are provided with bearings 24 in which is journalled a crank shaft 25 having a pair of crank arms 26 which carry the bearings 27 to which are connected their respective plunger rods 28, each of which has its upper end threaded to receive the plunger head 29 which is secured in its adjusted position by means of the nuts 30. Each plunger head 29 is guided in its casing 31, the bore of which is closed at its lower end by means of a closure 32 secured in position by means of fastening devices 33.

The upper end of the bar of the casing 31 is provided with a closure 34 which is secured in position by means of fastening devices 35. A spring 36 is interposed between the closure 34 and the plunger head 29, and in a similar manner a spring 37 is interposed between the plunger head 29 and the lower closure 32.

Each casing 31 is pivotally carried by the bifurcated arms of its yoke 38 connected with its respective bracket 39, see Figure 2, said brackets being connected to the chassis by means of fastening devices 40 and 41. The bifurcated arms of the yoke 38 are provided with bearing screws 42, see Figure 5, which engage the walls of the recesses 43, see Figure 6, so that each casing 31 is pivotally supported. Each bracket 39 is provided with an adjustable stop 44 in threaded engagement with its bracket 39, and a nut 45 is provided to secure said stop in its adjusted position. A spring 46 is connected with each casing 31 above its pivotal points, and such spring is also connected with its respective bracket 39, so that the tendency of the spring is to retain the casing 31 against its stop 44.

The crank shaft 25 has secured to it the pulleys 47 around which passes the cable 48, see Figures 1 and 2, said cables passing also around the pulleys 49 mounted on a shaft 50 pivotally journalled on the chassis 2. One of the pulleys 49 carries the pin 51 against which bears a plunger 52 which extends into a position accessible to the foot of the operator, and a set collar 53 is provided to limit the downward movement of the plunger 52, which latter serves as a controlling member for the releasing of the fender. The fender is reset by the operator by means of an arm 54 pivotally connected at 55 to one of the pulleys 49, and having a foot piece 56 which extends into a position accessible to the foot of the operator of the motor vehicle.

The rear wall of the fender is curved as indicated at 57 to form a braking surface or shoe, see Figure 1, in order that when the bumper is subjected to an abnormal shock it will have a braking action on the front wheels irrespective of the position to which the front wheels have been turned. The fender at its forward end is preferably provided with a shoe 58, which inclines downwardly and rearwardly, and enables the fender to ride over obstructions which extend above the normal grade of the road bed.

In order to prevent an object picked up by the fender passing beyond it, I preferably employ at the rear of the fender a bumper 59, supported in any desired manner and as illustrated by the casings 31.

I employ means to render the bumper inoperative to release the fender, and in order to illustrate a practical form of such means, I have shown the guides 18 nearest the crank, as slotted as indicated at 60 and a movably mounted member 61 is provided to move the tripping members 19 out of the path of the bearings 27 and crank arms 26 so that the rearward movement of the bumper will be ineffective at such times to release the fender.

The members 61 are operatively connected by means of a cable 62 with an operating member 63 in the form, as shown, of a spring pressed foot pedal under the control of the driver of the motor vehicle.

The operation of my novel combined fender and bumper will now be apparent to those skilled in the art to which this invention appertains and is as follows:

When the fender is in its raised position, as seen in full lines in Figure 2, the parts are locked in their raised position, since the crank arms 26 are slightly off center and the springs 46 are retaining their casings 31 in their neutral position. Assuming now that the bumper 20 comes into contact with a foreign object, such as for example a pedestrian or another motor vehicle, the bumper 20 will be moved rearwardly, thereby causing the rearward movement of the tripping and releasing members 19. As these tripping members 19 contact with the bearings 27, it will be apparent that the rearward movement of such members 19 will move rearwardly the bearings 27 off the center, so that the fender will be released and will drop into the position seen in dotted lines in Figure 2, thereby exerting a downward pull on the plunger rods 28, and the plunger heads move downwardly against the action of the springs 37. The bumper is returned to its normal forward position by the springs 23, as soon as the fender drops.

When it is desired to reset the fender, the operator presses down on the arm 54, thereby rotating the crank shaft 25 and returning the fender from the position seen in dotted lines in Figure 2 into the position seen in full lines in said figure.

If the operator at any time desires to release the fender, he presses with his foot on the plunger 52, thereby rotating the crank shaft 25 into a position to effect the release of the fender, as is evident.

When the fender is in dropped position, it is resiliently supported by the springs 37, so that the requisite elasticity or resiliency is provided to prevent injury to the parts if street obstructions are contacted with.

The shock due to the bumper 20 contacting with a foreign object is compensated for by the springs 17 and 22.

The casings 31 are returned to their normal position against their stops 44 when the fender is raised.

While I have shown in the drawings a plurality of tripping members actuated by the crank to effect the release of the fender from its raised position, it will of course be apparent that one of these can be omitted without departing from the spirit of the invention.

I have preferred to illustrate a plurality of resilient supports for the crank arms, but it will be apparent that one of these may be dispensed with, if desired.

It will be apparent that under abnormal shocks the fender is permitted bodily to move rearwardly until the brake portion 57 comes into contact with the wheels to effect a braking action thereon, so that a thrust will be imparted through the fender to the wheels.

If the bumper is subjected to an abnormal shock, the fender can move rearwardly against the action of the springs 17 and the braking portions 57 will contact with the tires on the front wheels. Springs 36 resist the upward movement of the fender and springs 37 its downward movement.

In the normal operation of the automatic release of the fender or of the manual release or resetting of the fender, these braking portions 57 do not come into contact with the wheel due to the action of the springs 17.

In some cases, it is advantageous to provide means to render the bumper inoperative at desired times to effect the release of the fender. If the pedal 63 is actuated to exert a pull on the cable 62, the member 61 moves the inner ends of the tripping member 19 into their inoperative position and when the pedal 63 is locked by the locking mechanism 64 the bumper will be ineffective to cause the release of the fender.

It will now be apparent that I have devised a novel and useful combined bumper and fender for motor vehicles which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:—

1. A device of the character stated, comprising a fender movably supported at one end, a bumper carried by said fender, a crank shaft carried by said fender and having its crank arms extending downwardly when the fender is in raised position, a resilient support for said crank shaft, and tripping means controlled by said bumper to actuate said crank shaft to effect the release of said fender.

2. A device of the character stated, comprising a fender movably supported at one end, a bumper carried by said fender, a crank shaft carried by said fender and having its crank arms extending downwardly when the fender is in raised position, a resilient support for said crank shaft, tripping means controlled by said bumper to actuate said crank shaft to effect the release of said fender, and means to effect the resetting of said fender.

3. A device of the character stated, comprising a fender movably supported at one end, a bumper carried by said fender, a crank shaft carried by said fender and having its crank arms extending downwardly when the fender is in raised position, a resilient support for said crank shaft, tripping means controlled by said bumper to actuate said crank shaft to effect the release of said fender, means independent of said bumper to actuate said crank shaft to effect the release of said fender.

4. A device of the character stated, comprising a fender movably supported at one end, a bumper carried by said fender, a crank shaft carried by said fender and having its crank arms extending downwardly when the fender is in raised position, a resilient support for said crank shaft, tripping means controlled by said bumper to actuate said crank shaft to effect the release of said fender, means independent of said bumper to actuate said crank shaft to effect the release of said fender, and means to effect the resetting of said fender.

5. A device of the character stated, comprising a fender movably supported at one end, a bumper carried by said fender, a crank shaft carried by said fender and having its crank arms extending downwardly when the fender is in raised position, a resilient support for said crank shaft, tripping means controlled by said bumper to actuate said crank shaft to effect the release of said fender, and resilient means to return the bumper to its normal position with respect to said fender.

6. A device of the character stated, comprising a fender movably supported at one end, a bumper carried by said fender, a crank shaft carried by said fender and having its crank arms extending downwardly when the fender is in raised position, a resilient support for said crank shaft, tripping means controlled by said bumper to actuate said crank shaft to effect the release of said fender, and means to cushion said fender when said bumper is actuated.

7. The combination with a mtor vehicle axle, of a fender movably carried by said axle, a bumper on said fender, a crank shaft connected with said fender and having its crank arms extending downwardly when the fender is in raised position, a resilient support movably mounted and operatively connected with said crank shaft, and a trip controlled by said bumper to actuate said crank shaft to effect the release of said fender.

8. In a device of the character stated, a fender pivotally supported at one end, and having independent resilient supporting means connected with said fender between its front and rear, a bumper operative when struck to release said independent supporting means, and means to render said bumper inoperative to effect the release of said independent resilient supporting means.

ALFRED C. McCLOSKEY.

Witnesses:
H. S. FAIRBANKS,
C. D. McVAY.